(12) United States Patent
Arai

(10) Patent No.: US 7,962,035 B2
(45) Date of Patent: Jun. 14, 2011

(54) VIEWFINDER OPTICAL SYSTEM, OPTICAL APPARATUS USING THE SAME AND METHOD FOR EXPANDING OBSERVATION

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 450 days.

(21) Appl. No.: 11/819,277

(22) Filed: Jun. 26, 2007

(65) Prior Publication Data

US 2007/0297787 A1 Dec. 27, 2007

(30) Foreign Application Priority Data

Jun. 27, 2006 (JP) ................................. 2006-176929

(51) Int. Cl.
*G03B 13/02* (2006.01)
(52) U.S. Cl. .................... 396/373; 359/431; 359/643
(58) Field of Classification Search .................. 396/373, 396/382, 383; 359/643, 648, 644, 656, 660
See application file for complete search history.

(56) References Cited

U.S. PATENT DOCUMENTS

| | | | | |
|---|---|---|---|---|
| 5,357,374 A * | 10/1994 | Ohno | ............................ | 359/689 |
| 5,729,382 A * | 3/1998 | Morita et al. | ................. | 359/376 |
| 5,926,321 A * | 7/1999 | Shikama | ....................... | 359/644 |
| 5,986,816 A * | 11/1999 | Shikama | ....................... | 359/644 |
| 6,253,033 B1 * | 6/2001 | Hasushita | ...................... | 396/382 |
| 6,263,168 B1 * | 7/2001 | Hasushita et al. | ............ | 396/382 |
| 6,417,973 B2 * | 7/2002 | Mihara et al. | ................. | 359/684 |
| 6,968,128 B2 * | 11/2005 | Itoh | ................................. | 396/79 |
| 7,145,732 B2 * | 12/2006 | Matsusaka et al. | ........... | 359/689 |
| 7,391,968 B2 * | 6/2008 | Takato | .......................... | 396/386 |
| 2003/0156834 A1 * | 8/2003 | Ogata | ........................... | 396/373 |
| 2006/0066950 A1 * | 3/2006 | Mitsuki et al. | ................. | 359/643 |
| 2009/0220224 A1 * | 9/2009 | Tochigi et al. | ................ | 396/386 |

FOREIGN PATENT DOCUMENTS

| | | |
|---|---|---|
| JP | 09-329752 | 12/1997 |
| JP | 2003-215471 | 7/2003 |
| JP | 2003-215471 A | 7/2003 |

* cited by examiner

*Primary Examiner* — Rodney E Fuller
*Assistant Examiner* — Linda B Smith
(74) *Attorney, Agent, or Firm* — Miles & Stockbridge P.C.

(57) ABSTRACT

Providing a viewfinder optical system capable of obtaining given magnification and a given eyepoint, suitable for an SLR digital camera and an SLR camera, an optical apparatus equipped therewith, and a method for expanding observation. The viewfinder optical system M including an eyepiece optical system 15 for observing a real image of an object formed by an objective lens 11 through an erecting image forming member 14, the eyepiece optical system 15 consisting of, in order from the object along an optical axis, a double concave negative lens, a double convex positive lens, a lens, and a meniscus lens having a convex surface facing the object; an optical apparatus 10 equipped therewith; and a method for expanding observation.

13 Claims, 7 Drawing Sheets

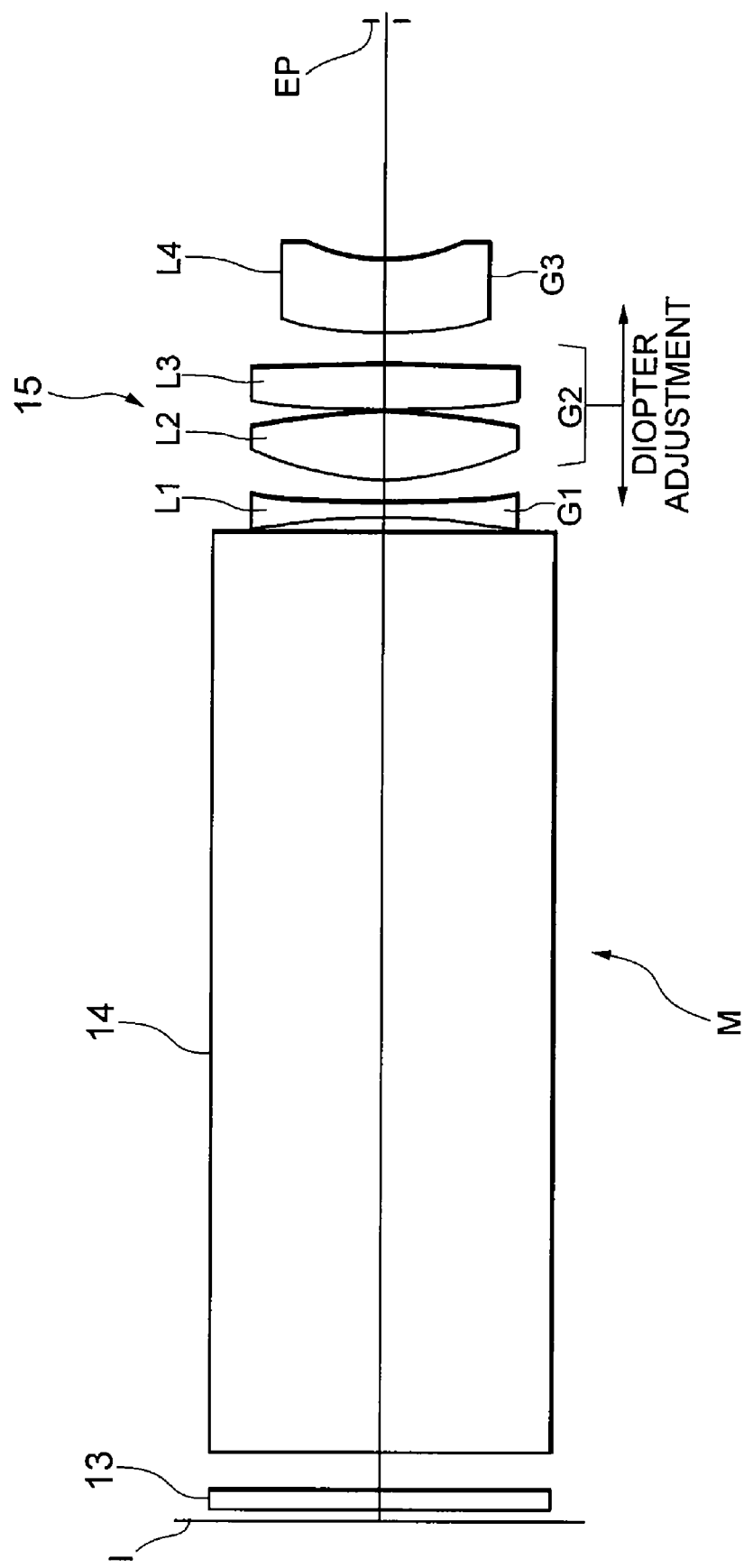

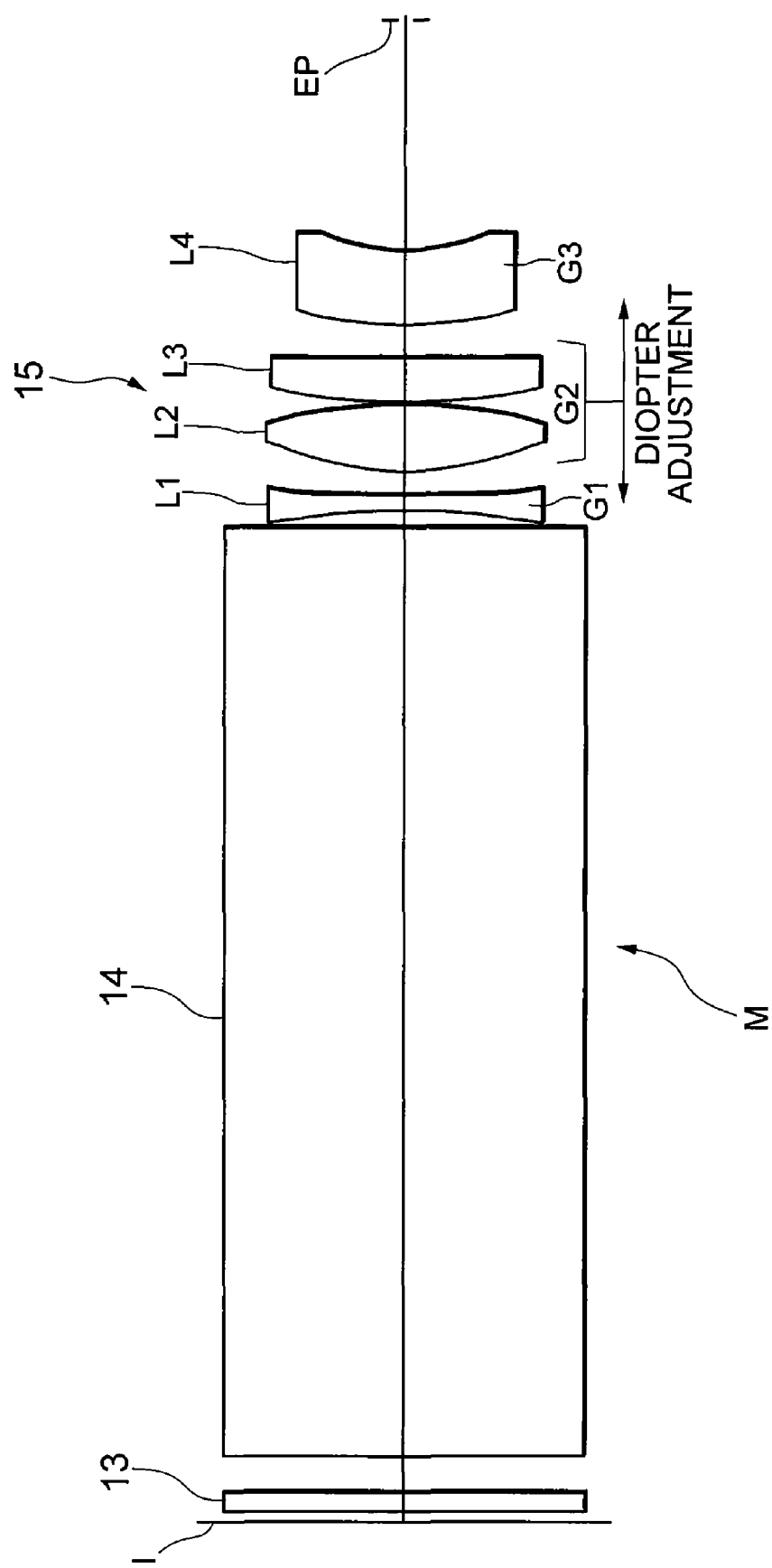

VIEWFINDER OPTICAL SYSTEM, OPTICAL APPARATUS USING THE SAME AND METHOD FOR EXPANDING OBSERVATION

The disclosure of the following priority application is herein incorporated by reference:
Japanese Patent Application No. 2006-176929 filed on Jun. 27, 2006.

BACKGROUND OF THE INVENTION

1. Field of the Invention

The present invention relates to a viewfinder optical system, an optical apparatus using the viewfinder optical system and a method for an expanding observation.

2. Related Background Art

A viewfinder optical system for a single-lens reflex (SLR) camera has been expected such that an observation magnification is high, a distance between the eyepiece and the eyepoint is long, and a diopter scale is adjustable. In order to make the observation magnification of a viewfinder high, the focal length of an eyepiece optical system is necessary to be shortened. However, the diopter scale of a viewfinder of an SLR camera is necessary to be set in the vicinity of −1 diopter, so that the substantial focal length of the viewfinder optical system is determined by the distance between the focusing screen and the eyepiece optical system. Accordingly, the simplest way is to shorten the optical path length of an erecting image forming member, and the distance between the focusing screen and the eyepiece optical system.

However, in this way, since the eyepiece optical system falls back from the rear side of the camera to the front side thereof, it becomes difficult to put an observer's eye near to the eyepiece optical system. On the other hand, when the distance between the eyepiece and the eyepoint is made sufficiently long, an effective diameter at the exit surface of the erecting image forming member has to be large resulting in inevitably lengthening the optical path length of the erecting image forming member, so that observation magnification of the viewfinder optical system becomes small. As described above, in a viewfinder optical system for an SLR camera, to heighten observation magnification and to lengthen the distance between the eyepiece and the eyepoint have been contrary to each other.

In the case of an SLR digital camera, since a display member for confirming an image is disposed on the rear side thereof, it becomes further difficult to observe the viewfinder of the camera unless the eyepiece optical system is disposed closer to the rear side of the camera than before.

Moreover, when the observer wears glasses, unless the diopter scale is fitted to the observer, the observer's eye has to be closer to the eyepiece optical system, so that the observer finds it difficult to observe the viewfinder of the camera. Therefore, a diopter adjustment mechanism becomes an indispensable function for an eyepiece optical system.

Other than the conventional method to shorten the optical path length of the erecting image forming member, there has been proposed a method to lengthen the total length of the eyepiece optical system with heightening observation magnification by means of increasing the number of lenses composing the eyepiece optical system (for example, Japanese Patent Application Laid-Open No. 2003-215471).

However, the disclosed example of Japanese Patent Application Laid-Open No. 2003-215471 cannot secure sufficient observation magnification. Accordingly, when a small-size solid-state imaging device, which is used in an SLR digital camera, is used, the image capable of being observed by the viewfinder optical system becomes extremely small. A viewfinder optical system for an SLR camera is expected such that observation magnification is high, a distance between the eyepiece and the eyepoint is long, and diopter is adjustable. When all the requirements are made to be satisfied, the whole optical system becomes complicated, so that it becomes difficult to satisfactorily show respective functions' ability.

SUMMARY OF THE INVENTION

The present invention is made in view of the aforementioned problems and has an object to provide a viewfinder optical system having a given observation magnification and a given distance between the eyepiece and the eyepoint, and suitable for an SLR digital camera and an SLR camera, and to provide an optical apparatus using the viewfinder.

According to a first aspect of the present invention, there is provided a viewfinder optical system including an eyepiece optical system for observing a real image of an object formed by an objective lens through an erecting image forming member, the eyepiece optical system consisting of, in order from the object along an optical axis, a double concave negative lens, a double convex positive lens, a lens, and a meniscus lens having a convex surface facing the object.

According to a second aspect of the present invention, there is provided an optical apparatus using the aforesaid viewfinder optical system.

According to a third aspect of the present invention, there is provided a method for expanding observation comprising steps of: forming a real image of an object by an objective lens; providing an eyepiece optical system that consists of, in order from an object along an optical axis, a double concave negative lens, a double convex positive lens, a lens, and a meniscus lens having a convex surface facing the object; and carrying out expanding observation of the real image through an erecting image forming member and the eyepiece optical system.

According to the present invention, it becomes possible to provide a viewfinder optical system capable of obtaining a given observation magnification and a given distance between the eyepiece and the eyepoint, and suitable for an SLR digital camera and an SLR camera, and to provide an optical apparatus using the viewfinder, and a method for expanding observation.

BRIEF DESCRIPTION OF THE DRAWINGS

FIG. 2 is a diagram showing a construction of optical elements of a viewfinder optical system M according to Example 1 of the present embodiment, in which the diopter scale of an eyepiece optical system 15 is −1.0 diopter.

FIGS. 3A, 3B, 3C are graphs showing various aberrations of the viewfinder optical system M according to Example 1 at the eyepoint EP, in which FIG. 3A shows various aberrations in a state of −1.0 diopter, FIG. 3B shows various aberrations in a state of −2.0 diopter, and FIG. 3C shows various aberrations in a state of +1.0 diopter.

FIGS. 5A, 5B, 5C are graphs showing various aberrations of the viewfinder optical system M according to Example 2 at the eyepoint EP, in which FIG. 5A shows various aberrations in a state of −1.0 diopter, FIG. 5B shows various aberrations in a state of −2.0 diopter, and FIG. 5C shows various aberrations in a state of +1.0 diopter.

FIG. 6 is a diagram showing a construction of optical elements of a viewfinder optical system M according to Example 3 of the present embodiment, in which the diopter scale of an eyepiece optical system 15 is −1.0 diopter.

FIGS. 7A, 7B, 7C are graphs showing various aberrations of the viewfinder optical system M according to Example 3 at the eyepoint EP, in which FIG. 7A shows various aberrations in a state of −1.0 diopter, FIG. 7B shows various aberrations in a state of −2.0 diopter, and FIG. 7C shows various aberrations in a state of +1.0 diopter.

DETAILED DESCRIPTION OF THE MOST PREFERRED EMBODIMENT

An embodiment according to the present invention is explained below.

Figure 1:
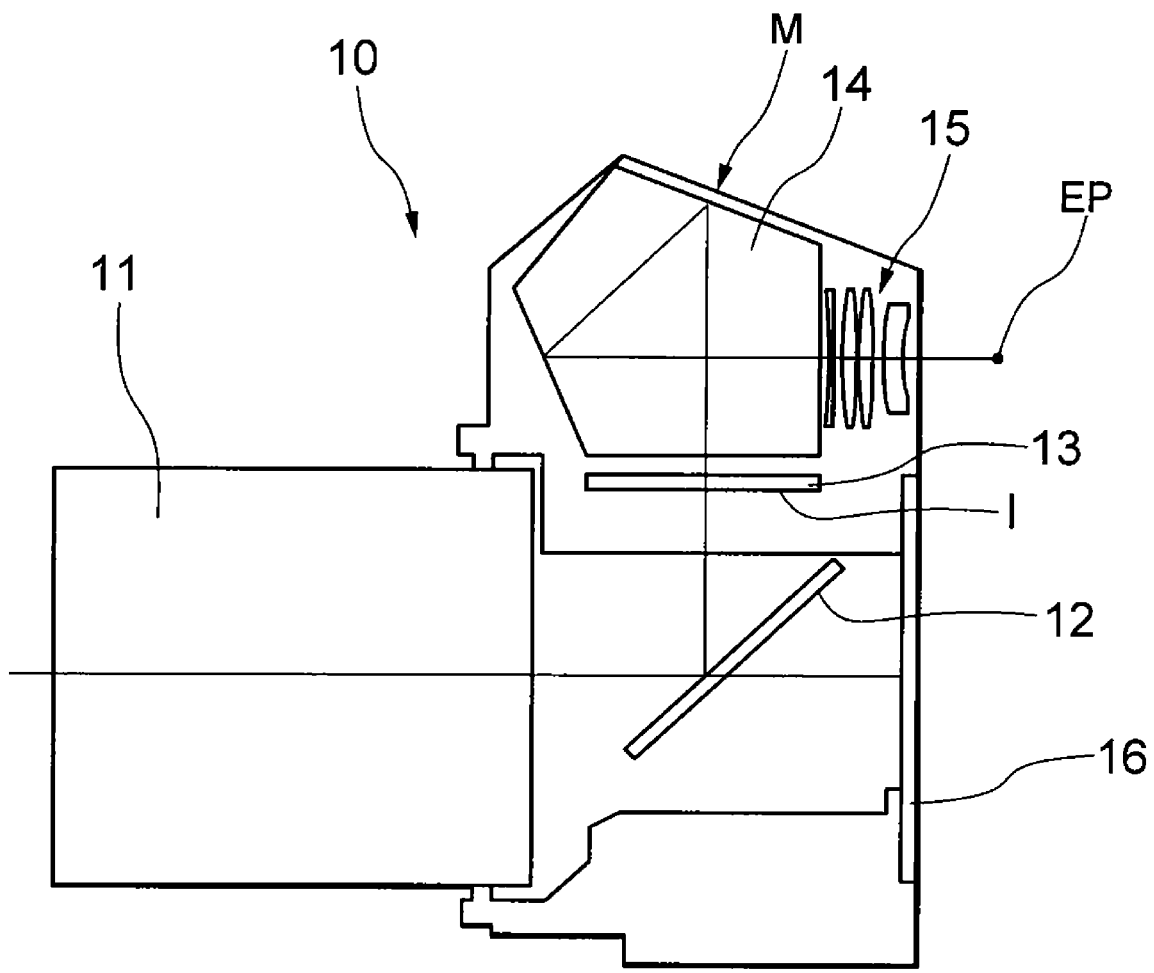
FIG. 1 is a diagram showing a construction of a camera which is equipped with a viewfinder optical system according to the present embodiment.

FIG. 1 is a schematic diagram showing a construction of a camera which is equipped with a viewfinder optical system explained later.

In the camera 10 according to the present embodiment shown in FIG. 1, light emitted from a subject (not shown) is converged by an objective lens 11, and focused on an image plane I through a quick return mirror 12 forming a real image on a focusing screen 13 disposed in the vicinity of the image plane I. Light emitted from the focusing screen 13 is reflected by an erecting image forming member 14 and led to an eyepiece optical system 15. The light forming an erecting image by the erecting image forming member 14 is magnified by the eyepiece optical system 15 and led to an eyepoint EP. In this manner, a photographer can carry out expanding observation of a subject image as an erecting image through the eyepiece optical system 15 of the viewfinder optical system M.

When the photographer presses a shutter release button (not shown), the quick return mirror 12 is removed from an optical path, and the light from the subject (not shown) reaches an imaging device 16. Accordingly, the light from the subject is captured by the imaging device 16 and stored in a memory (not shown) as a subject image. In this manner, the photographer can take a picture of the subject by the camera 10.

Then, a viewfinder optical system M according to the present embodiment is explained.

A viewfinder optical system M according to the present embodiment includes an eyepiece optical system 15 for observing a real image of an object formed by an objective lens 11 through an erecting image forming member 14. The eyepiece optical system 15 preferably consists of, in order from the object along an optical axis, a double concave negative lens, a double convex positive lens, a positive or negative lens, and a meniscus lens having a convex surface facing the object. With this construction, it becomes possible to preferably correct lateral chromatic aberration generating upon increasing magnification. Moreover, it becomes possible to lengthen the length of the viewfinder optical system M with preferably correcting spherical aberration. With constructing the eyepiece optical system 15 by four lenses, it becomes possible to make the principal point of the eyepiece optical system 15 closer to the focusing screen 13, and to keep the whole length of the viewfinder optical system M long.

In a viewfinder optical system M according to the present embodiment, the following conditional expressions (1) and (2) are preferably satisfied:

$$-0.5 < (G1RO+G1RE)/(G1RO-G1RE) \leq 0 \quad (1)$$

$$-0.6 < (G2RO+G2RE)/(G2RO-G2RE) \leq 0 \quad (2)$$

where G1RO denotes a radius of curvature of the object side surface of the double concave negative lens in the eyepiece optical system, G1RE denotes a radius of curvature of the pupil side surface of the double concave negative lens, G2RO denotes a radius of curvature of the object side surface of the double convex positive lens, and G2RE denotes a radius of curvature of the pupil side surface of the double convex positive lens. By the way, the pupil means an exit pupil, and the explanation is the same in the other Examples below.

Conditional expression (1) defines an appropriate range of the shape factor of the double concave negative lens. When the ratio exceeds the upper limit of conditional expression (1), it becomes difficult to correct lateral chromatic aberration upon increasing magnification, so that it is undesirable. On the other hand, when the ratio is equal to or falls below the lower limit of conditional expression (1), magnification has to be increased by the rear side lenses, so that it becomes difficult to correct spherical aberration and astigmatism. Therefore, it is undesirable. In order to secure the effect of the present invention, it is preferable to set the lower limit of conditional expression (1) to −0.3. In order to secure the effect of the present invention, it is preferable to set the upper limit of conditional expression (1) to −0.1.

Conditional expression (2) defines an appropriate range of the shape factor of the double convex positive lens. When the ratio exceeds the upper limit of conditional expression (2), it becomes difficult to correct lateral chromatic aberration and spherical aberration upon increasing magnification, so that it is undesirable. On the other hand, when the ratio is equal to or falls below the lower limit of conditional expression (2), it becomes difficult to secure the position of the eyepoint in a proper position, and on this occasion it becomes difficult to correct astigmatism, so that it is undesirable. In order to secure the effect of the present invention, it is preferable to set the lower limit of conditional expression (2) to −0.55. In order to secure the effect of the present invention, it is preferable to set the upper limit of conditional expression (2) to −0.2.

In a viewfinder optical system M according to the present embodiment, the following conditional expressions (1) and (3) are preferably satisfied:

$$-0.5 < (G1RO+G1RE)/(G1RO-G1RE) \leq 0 \quad (1)$$

$$2.0 < (G4RO+G4RE)/(G4RO-G4RE) < 4.0 \quad (3)$$

where G1RO denotes a radius of curvature of the object side surface of the double concave negative lens in the eyepiece optical system, G1RE denotes a radius of curvature of the pupil side surface of the double concave negative lens, G4RO denotes a radius of curvature of the object side surface of the meniscus lens having a convex surface facing the object, and G4RE denotes a radius of curvature of the pupil side surface of the meniscus lens having a convex surface facing the object.

Conditional expression (1) defines an appropriate range of the shape factor of the double concave negative lens. When the ratio exceeds the upper limit of conditional expression (1), it becomes difficult to correct lateral chromatic aberration upon increasing magnification, so that it is undesirable. On the other hand, when the ratio is equal to or falls below the lower limit of conditional expression (1), magnification has to be increased by the rear side lenses, so that it becomes difficult to correct spherical aberration and astigmatism. Therefore, it is undesirable. In order to secure the effect of the present invention, it is preferable to set the lower limit of conditional expression (1) to −0.3. In order to secure the effect of the present invention, it is preferable to set the upper limit of conditional expression (1) to −0.1.

Conditional expression (3) defines an appropriate range of the shape factor of the meniscus lens having a convex surface facing the object. When the ratio is equal to or exceeds the upper limit of conditional expression (3), it becomes difficult to secure the position of the eyepoint in a proper position, and on this occasion it becomes difficult to correct astigmatism, so that it is undesirable. On the other hand, when the ratio is equal to or falls below the lower limit of conditional expression (3), it becomes difficult to correct lateral chromatic aberration and spherical aberration upon increasing magnification, so that it is undesirable. In order to secure the effect of the present invention, it is preferable to set the lower limit of conditional expression (3) to 3.0. In order to secure the effect of the present invention, it is preferable to set the upper limit of conditional expression (3) to 3.7.

In a viewfinder optical system M according to the present embodiment, the following conditional expressions (2) and (3) are preferably satisfied:

$$-0.6<(G2RO+G2RE)/(G2RO-G2RE)\leq 0 \quad (2)$$

$$2.0<(G4RO+G4RE)/(G4RO-G4RE)<4.0 \quad (3)$$

where G2RO denotes a radius of curvature of the object side surface of the double convex positive lens, G2RE denotes a radius of curvature of the pupil side surface of the double convex positive lens, G4RO denotes a radius of curvature of the object side surface of the meniscus lens having a convex surface facing the object, and G4RE denotes a radius of curvature of the pupil side surface of the meniscus lens having a convex surface facing the object.

Conditional expression (2) defines an appropriate range of the shape factor of the double convex positive lens. When the ratio exceeds the upper limit of conditional expression (2), it becomes difficult to correct lateral chromatic aberration and spherical aberration upon increasing magnification, so that it is undesirable. On the other hand, when the ratio is equal to or falls below the lower limit of conditional expression (2), it becomes difficult to secure the position of the eyepoint in a proper position, and on this occasion it becomes difficult to correct astigmatism, so that it is undesirable. In order to secure the effect of the present invention, it is preferable to set the lower limit of conditional expression (2) to −0.55. In order to secure the effect of the present invention, it is preferable to set the upper limit of conditional expression (2) to −0.2.

Conditional expression (3) defines an appropriate range of the shape factor of the meniscus lens having a convex surface facing the object. When the ratio is equal to or exceeds the upper limit of conditional expression (3), it becomes difficult to secure the position of the eyepoint in a proper position, and on this occasion it becomes difficult to correct astigmatism, so that it is undesirable. On the other hand, when the ratio is equal to or falls below the lower limit of conditional expression (3), it becomes difficult to correct lateral chromatic aberration and spherical aberration upon increasing magnification, so that it is undesirable. In order to secure the effect of the present invention, it is preferable to set the lower limit of conditional expression (3) to 3.0. In order to secure the effect of the present invention, it is preferable to set the upper limit of conditional expression (3) to 3.7.

In a viewfinder optical system M according to the present embodiment, the following conditional expressions (4) through (6) are preferably satisfied:

$$0.20<Fd/Pd<0.50 \quad (4)$$

$$1.80<ndGF \quad (5)$$

$$1.70<ndGE \quad (6)$$

where ndGF denotes refractive index of a lens disposed to the most object side of the eyepiece optical system 15, ndGE denotes refractive index of a lens disposed to the most pupil side, Pd denotes an optical path length of the erecting image forming member, and Fd denotes a distance between the pupil side exit surface of the erecting image forming member and the last lens surface of the eyepiece optical system.

Conditional expression (4) defines a relation between the optical path length of the erecting image forming member and the distance between the pupil side exit surface of the erecting image forming member and the last lens surface of the eyepiece optical system. When the ratio is equal to or exceeds the upper limit of conditional expression (4), it becomes difficult to secure the magnification, or in order to secure the magnification, lateral chromatic aberration increases, so that it is undesirable. On the other hand, when the ratio is equal to or falls below the lower limit of conditional expression (4), it becomes difficult to secure the position of the eyepoint EP, or in order to secure the proper position of the eyepoint EP, astigmatism increases, so that it is undesirable.

In order to secure the effect of the present invention, it is preferable to set the upper limit of conditional expression to 0.40. In order to further secure the effect of the present invention, it is more preferable to set the upper limit of conditional expression to 0.35.

Conditional expression (5) defines refractive index of a lens disposed to the most object side of the eyepiece optical system. When the value is equal to or falls below the lower limit of conditional expression (5), it becomes difficult to secure the proper position of the eyepoint EP, and lateral chromatic aberration increases, so that it is undesirable. In order to secure the effect of the present invention, it is preferable to set the lower limit of conditional expression to 1.81.

Conditional expression (6) defines refractive index of a lens disposed to the most pupil side. When the value is equal to or falls below the lower limit of conditional expression (6), it becomes difficult to secure the proper position of the eyepoint EP, and lateral chromatic aberration increases, so that it is undesirable. In order to secure the effect of the present invention it is preferable to set the lower limit of conditional expression (6) to 1.80. In order to further secure the effect of the present invention it is more preferable to set the lower limit of conditional expression (6) to 1.81.

In a viewfinder optical system M according to the present embodiment, an eyepiece optical system 15 consists of, in order from an objective lens 11 side along an optical axis, a first lens group having negative refractive power, a second lens group having positive refractive power, and a third lens group having negative refractive power. The second lens group consists of two lenses. It is preferable that diopter adjustment is carried out by moving the second lens group along the optical axis. With carrying out diopter adjustment by moving the second lens group and constructing the first and third lens groups to be fixed, the total lens length of the eyepiece optical system 15 upon carrying out diopter adjustment becomes unchangeable, so that it becomes possible to fit the eyepiece optical system into a block. Accordingly, it becomes possible to prevent a foreign substance from getting into the viewfinder optical system M. Since the viewfinder optical system M locating in the most outside position of a camera 10 always receives external force, by constructing the third lens group to be fixed, it becomes possible to construct effective structure against external force. Moreover, it becomes possible to suppress coma in particular.

In a viewfinder optical system M according to the present embodiment, it is preferable that the eyepiece optical system 15 consists of, in order from the objective lens 11 side along the optical axis, a first lens group having negative refractive power, a second lens group having positive refractive power, and a third lens group having negative refractive power, and any one of three lens groups preferably has an aspherical surface. With employing an aspherical surface in any one of three lens groups, it becomes possible to suppress variation in coma and distortion upon changing diopter, so that it becomes possible to preferably correct various aberrations in each diopter state.

Moreover, in a viewfinder optical system M, it is preferable to provide a method for expanding observation that includes steps of: forming a real image of an object by an objective lens; providing an eyepiece optical system 15 that consists of, in order from an object along an optical axis, a double concave negative lens, a double convex positive lens, a lens, and a meniscus lens having a convex surface facing the object; and carrying out expanding observation of the real image through an erecting image forming member 14 and the eyepiece optical system 15. With employing the method, lateral chromatic aberration can excellently be corrected upon increasing observation magnification, the principal point of the eyepiece optical system 15 can be brought near to the focusing screen 13 on which the real image of the object is formed, and the total length of the viewfinder optical system M can be kept long so as to secure a desired magnification.

EXAMPLES

Each example of a viewfinder optical system M according to the present embodiment will be explained below with reference to accompanying drawings.

Example 1

FIG. 2 is a diagram showing a construction of optical elements of a viewfinder optical system M according to Example 1 of the present embodiment, in which the diopter scale of an eyepiece optical system 15 is −1.0 diopter. As shown in FIG. 1, the optical path of the viewfinder optical system M is folded, however, the optical path is extended in the diagram.

In the viewfinder optical system shown in FIG. 2, a real image of an object formed on a focusing screen 13 disposed in the vicinity of an image plane I of an objective lens 11 shown in FIG. 1 is incident on an eyepiece optical system 15 through an erecting image forming member 14.

The eyepiece optical system 15 is composed of, in order from the focusing screen 13 side along an optical axis, a first lens group G1 constructed by a double concave negative lens L1, a second lens group G2 constructed by a double convex positive lens L2 and a double convex positive lens L3, and a third lens group G3 constructed by a negative meniscus lens L4 having a concave surface facing an eyepoint EP side. Light passing through the eyepiece optical system 15 reaches the eyepoint EP. Diopter adjustment is carried out by moving the two positive lenses L2 and L3 of the second lens group G2 along the optical axis. In this order, the object image and a field frame formed on the focusing screen 13 can be observed with expanding manner at the eyepoint EP through the eyepiece optical system 15.

Various values associated with a viewfinder optical system M according to Example 1 are listed in Table 1. In [Specifications], X denotes a diopter scale (unit: diopter $[m^{-1}]$), f denotes a focal length, EP denotes an eyepoint, and ω denotes a half angle of view of the viewfinder optical system (unit: degree). In [Lens Data], a surface number is a number counted in order from the object side, r denotes a radius of curvature of the lens surface, d denotes a distance to the next surface, ν denotes Abbe number at d-line (wavelength λ=587.56 nm), and n denotes refractive index at d-line (wavelength λ=587.56 nm). Here, "r=∞" means a plane surface or an aperture surface, and refractive index of the air n=1.000000 is omitted.

Moreover, the unit of the diopter scale described in the specification is "diopter $[m^{-1}]$", in which the diopter scale X $[m^{-1}]$ means an image formed by the viewfinder optical system is formed at a position 1/X (m) away from the eyepoint EP. Here, the sign is positive when the image is formed to the object side of the eyepoint. In [Aspherical Data], aspherical coefficients expressed by the following aspherical expression are shown:

$$X(y)=y^2/[r\times\{1+(1-k\times(y^2/r^2))^{1/2}\}]+C4\times y^4+C6\times y^6+C8\times y^8$$

where X(y) denotes a distance along the optical axis between the tangent surface at the vertex of the aspherical surface and the aspherical surface at the vertical height y from the optical axis, r denotes a radius of curvature of a reference sphere (paraxial radius of curvature), k denotes a conical coefficient, and Ci denotes an aspherical coefficient of i-th order. "E-n" means "$10^{-n}$" where n is an integer. In [Variable Distances], the focal length and variable distance with respect to each diopter scale are shown. In [Values for Conditional Expressions], values for respective conditional expressions are shown.

In the tables for various values, unless otherwise specified, "mm" is generally used for the unit of length such as the focal length f, the radius of curvature r and the distance to the next lens surface d. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

| [Specifications] | | | |
| --- | --- | --- | --- |
| Diopter(X) = | −1.00864 | −2.01922 | +1.05858 |
| f = | 52.07590 | 52.55815 | 51.21093 |
| EP = | 19.50000 | 18.40000 | 21.90000 |
| ω = | 15.58889° | 15.68778° | 15.35417° |

| [Lens Data] | | | | |
| --- | --- | --- | --- | --- |
| | r | d | ν | n |
| 0) | ∞ | 0.8000 | | (Image Plane I) |
| 1) | ∞ | 1.4000 | 57.57 | 1.491080 (Focusing Screen 13) |
| 2) | ∞ | 3.1000 | | |
| 3) | ∞ | 76.5873 | 64.19 | 1.516798 (Erecting Image Forming Member 14) |
| 4) | ∞ | 1.3000 | | |
| 5) | −70.0000 | 1.2000 | 23.78 | 1.846660 |
| 6) | 97.6761 | (D1) | | |

TABLE 1-continued

| | | | | |
|---|---|---|---|---|
| 7) | 21.0478 | 5.6000 | 61.24 | 1.589130 (Aspherical Surface) |
| 8) | −52.7877 | 0.2000 | | |
| 9) | 83.8233 | 3.6000 | 37.16 | 1.834000 |
| 10) | −483.2255 | (D2) | | |
| 11) | 29.7747 | 6.0000 | 40.76 | 1.882997 |
| 12) | 15.8937 | (D3) | | |

[Aspherical Data]
Surface Number: 7 k = 0.2667
C4 = −1.99400E−05
C6 = 9.32780E−09
C8 = −4.22110E−12

[Variable Distances]

| Diopter | −1.00864 | −2.01922 | +1.05858 |
|---|---|---|---|
| f | 52.07590 | 52.55815 | 51.21093 |
| D1 | 1.88000 | 1.20000 | 3.40000 |
| D2 | 2.72000 | 3.40000 | 1.20000 |
| D3 | 19.50000 | 18.40000 | 21.90000 |

[Values for Conditional Expressions]

(1) (G1RO + G1RE)/(G1RO − G1RE) = −0.1651
(2) (G2RO + G2RE)/(G2RO − G2RE) = −0.4299
(3) (G4RO + G4RE)/(G4RO − G4RE) = +3.2900
(4) Fd/Pd = 0.2938
(5) ndGF = 1.846660
(6) ndGE = 1.882997

Figure 3A:
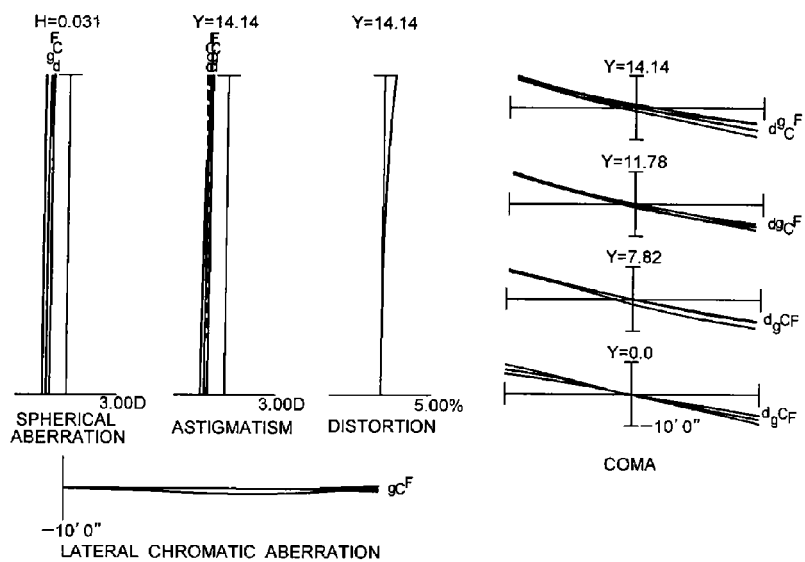
Figure 3B:
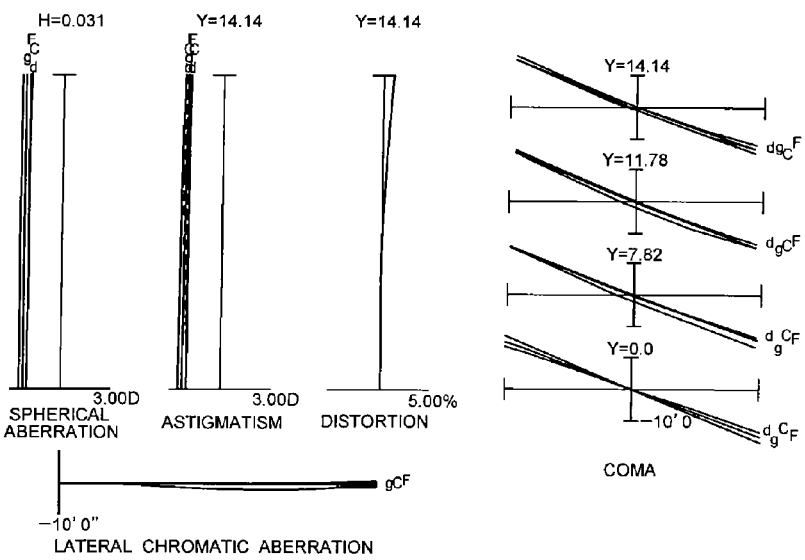
Figure 3C:
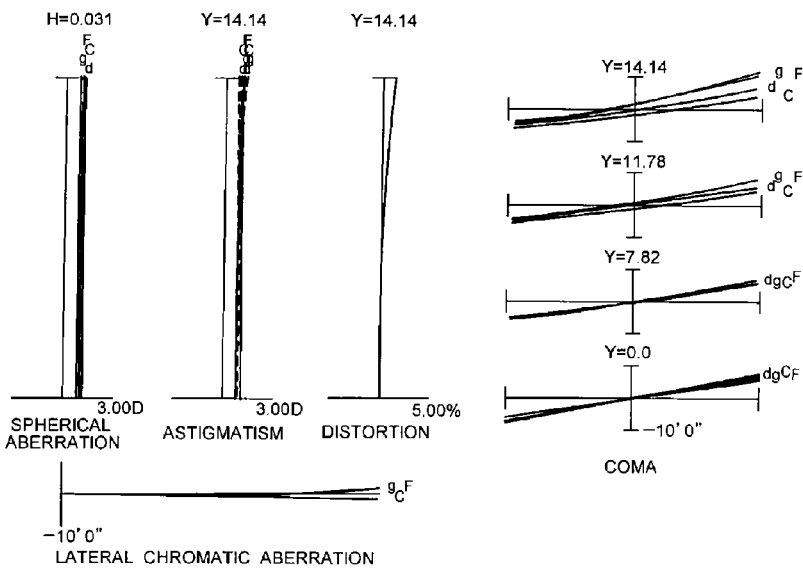

FIGS. 3A, 3B, 3C are graphs showing various aberrations of the viewfinder optical system M according to Example 1 at the eyepoint EP, in which FIG. 3A shows various aberrations in a state of −1.0 diopter, FIG. 3B shows various aberrations in a state of −2.0 diopter, and FIG. 3C shows various aberrations in a state of +1.0 diopter.

Aberration graphs show, in order from the left, spherical aberration, astigmatism, distortion and coma. The vertical axis in spherical aberration is an incident height H on the viewfinder optical system M. The vertical axis in astigmatism and distortion is an image height Y on the focusing screen 13. The transverse axes in spherical aberration and astigmatism are diopter. The transverse axis in distortion is a percentage. The vertical axis in coma is an image height on the focusing screen 13. The unit in coma is degree. In the graph showing astigmatism, a solid line indicates astigmatism in a sagittal direction, and a broken line indicates astigmatism in a meridional direction. In respective graphs, d denotes aberration curve at d-line (wavelength λ=587.6 nm), g denotes aberration curve at g-line (wavelength λ=435.8 nm), C denotes aberration curve at C-line (wavelength λ=656.3 nm), and F denotes aberration curve at F-line (wavelength λ=486.1 nm). The above-described explanation regarding various aberration graphs is the same in the other examples, so that duplicated explanations are omitted.

As is apparent from the respective graphs, the viewfinder optical system M according to Example 1 shows superb optical performance as a result of good corrections to various aberrations in the image field up to the periphery over entire diopter correction range from −2.0 diopter to +1.0 diopter.

Example 2

Figure 4:
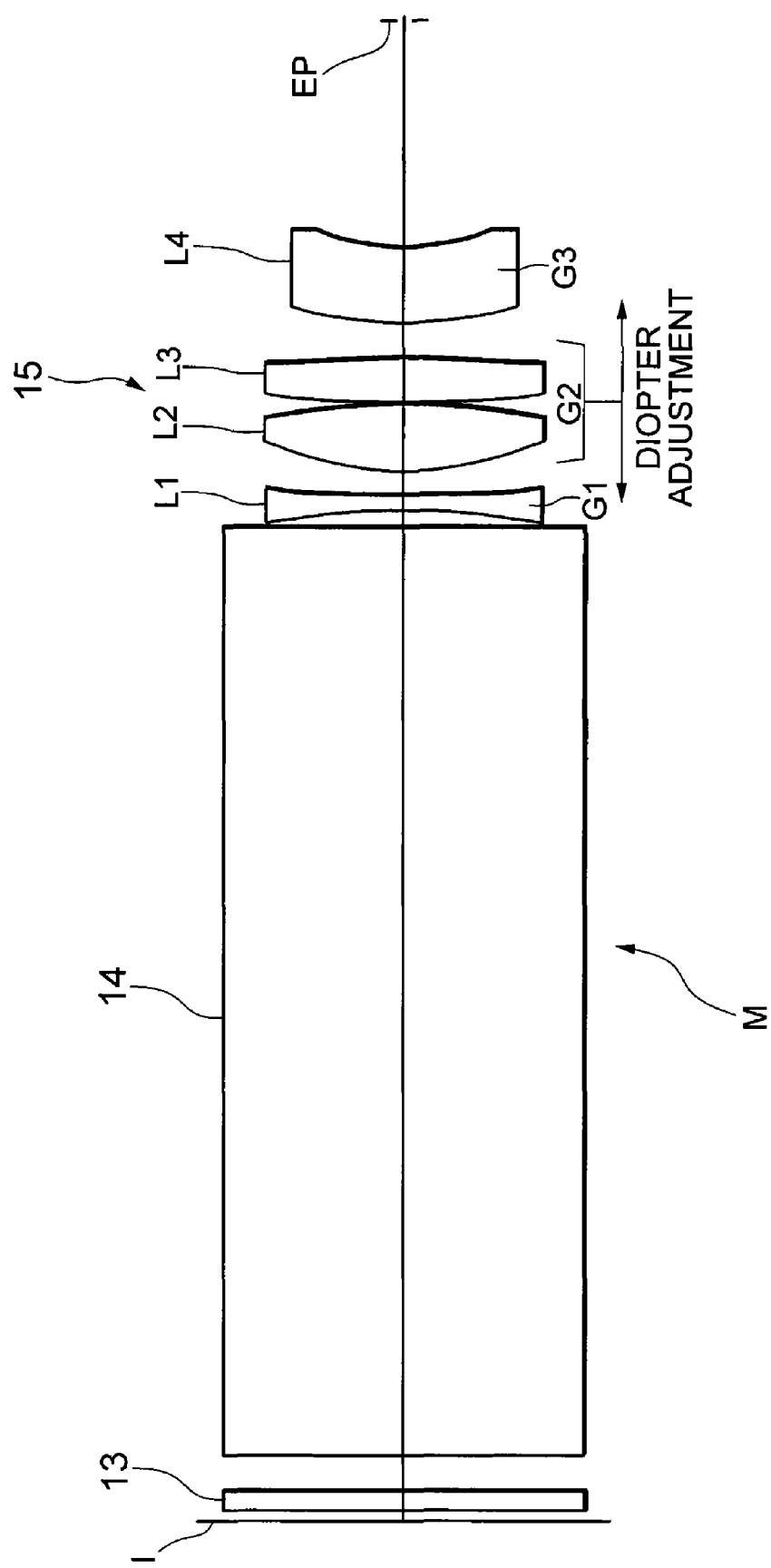
FIG. 4 is a diagram showing a construction of optical elements of a viewfinder optical system M according to Example 2 of the present embodiment, in which the diopter scale of an eyepiece optical system 15 is −1.0 diopter.

FIG. 4 is a diagram showing a construction of optical elements of a viewfinder optical system M according to Example 2 of the present embodiment, in which the diopter scale of an eyepiece optical system 15 is −1.0 diopter.

In the viewfinder optical system shown in FIG. 4, a real image of an object formed on a focusing screen 13 disposed in the vicinity of an image plane I of an objective lens 11 shown in FIG. 1 is incident on an eyepiece optical system 15 through an erecting image forming member 14.

The eyepiece optical system 15 is composed of, in order from the focusing screen 13 side along an optical axis, a first lens group G1 constructed by a double concave negative lens L1, a second lens group G2 constructed by a double convex positive lens L2 and a double convex positive lens L3, and a third lens group G3 constructed by a negative meniscus lens L4 having a concave surface facing an eyepoint EP side. Light passing through the eyepiece optical system 15 reaches the eyepoint EP. Diopter adjustment is carried out by moving the two positive lenses L2 and L3 of the second lens group G2 along the optical axis. In this order, the object image and a field frame formed on the focusing screen 13 can be observed with expanding manner at the eyepoint EP through the eyepiece optical system 15.

Various values associated with a viewfinder optical system M according to Example 2 are listed in Table 2.

TABLE 2

[Specifications]

| Diopter(X) = | −1.08844 | −2.09730 | +1.01758 |
|---|---|---|---|
| f = | 52.12776 | 52.58515 | 51.29786 |
| EP = | 19.50000 | 18.40000 | 22.00000 |
| ω = | 15.56917° | 15.67639° | 15.30667° |

[Lens Data]

| | r | d | ν | n | |
|---|---|---|---|---|---|
| 0) | ∞ | 0.8000 | | | (Image Plane I) |
| 1) | ∞ | 1.4000 | 57.57 | 1.491080 | (Focusing Screen 13) |
| 2) | ∞ | 3.1000 | | | |
| 3) | ∞ | 76.5873 | 64.19 | 1.516798 | (Erecting Image forming Member 14) |
| 4) | ∞ | 1.3000 | | | |
| 5) | −68.3066 | 1.2000 | 23.78 | 1.846660 | |
| 6) | 109.5694 | (D1) | | | |
| 7) | 19.7660 | 5.6000 | 56.21 | 1.524440 | (Aspherical Surface) |
| 8) | −59.1596 | 0.2000 | | | |
| 9) | 79.7492 | 3.6000 | 52.32 | 1.754999 | |
| 10) | −147.9240 | (D2) | | | |
| 11) | 28.3056 | 6.2000 | 40.76 | 1.882997 | |
| 12) | 15.3891 | (D3) | | | |

[Aspherical Data]
Surface Number: 7 k = 0.0632
C4 = −1.90920E−05
C6 = 1.09390E−08
C8 = −3.30130E−12

[Variable Distances]

| Diopter | −1.08844 | −2.09730 | +1.01758 |
|---|---|---|---|
| f | 52.12776 | 52.58515 | 51.29786 |
| D1 | 1.80000 | 1.10000 | 3.40000 |
| D2 | 2.80000 | 3.50000 | 1.20000 |
| D3 | 19.50000 | 18.40000 | 22.00000 |

[Values for Conditional Expressions]

(1) (G1RO + G1RE)/(G1RO − G1RE) = −0.2320
(2) (G2RO + G2RE)/(G2RO − G2RE) = −0.4991
(3) (G4RO + G4RE)/(G4RO − G4RE) = +3.3829
(4) Fd/Pd = 0.2964
(5) ndGF = 1.846660
(6) ndGE = 1.882997

Figure 5A:
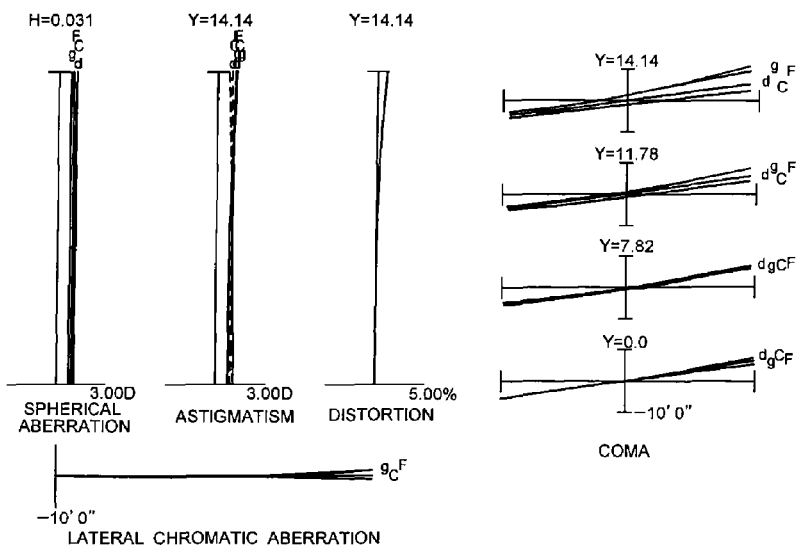
Figure 5B:
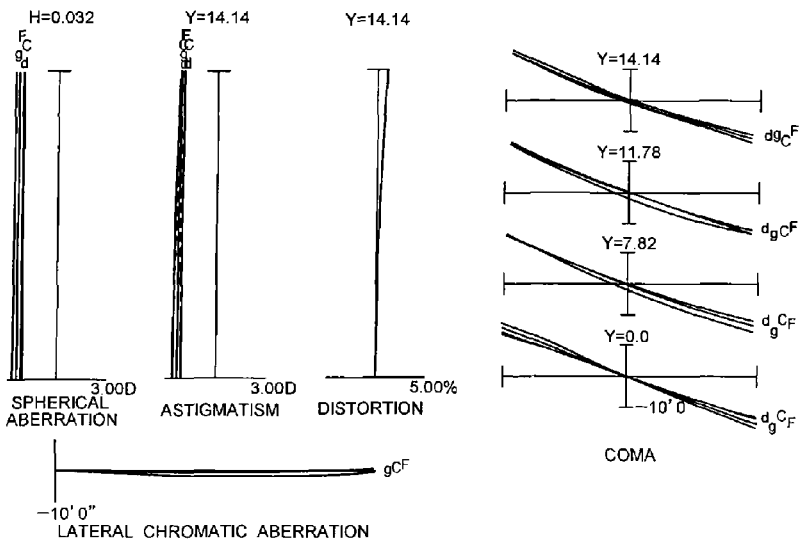
Figure 5C:
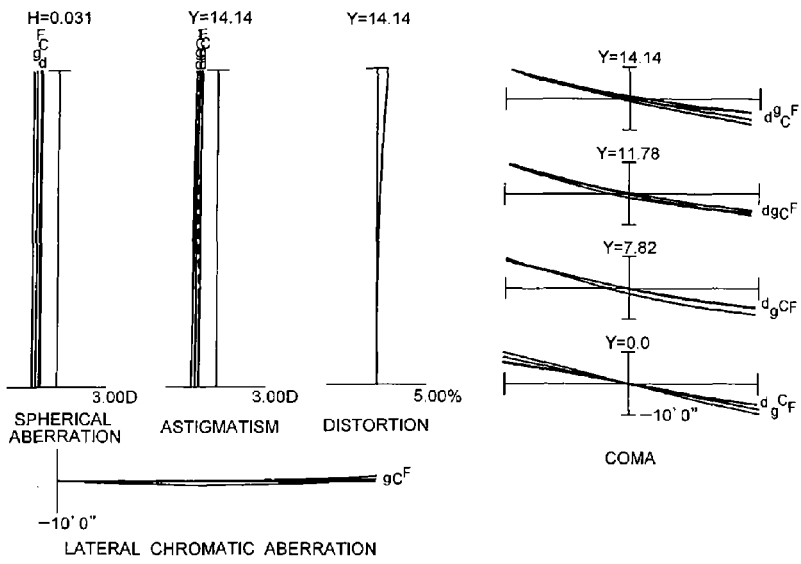

FIGS. 5A, 5B, 5C are graphs showing various aberrations of the viewfinder optical system M according to Example 2 at the eyepoint EP, in which FIG. 5A shows various aberrations in a state of −1.0 diopter, FIG. 5B shows various aberrations in a state of −2.0 diopter, and FIG. 5C shows various aberrations in a state of +1.0 diopter.

As is apparent from the respective graphs, the viewfinder optical system M according to Example 2 shows superb optical performance as a result of good corrections to various aberrations in the image field up to the periphery over entire diopter correction range from −2.0 diopter to +1.0 diopter.

Example 3

FIG. 6 is a diagram showing a construction of optical elements of a viewfinder optical system M according to Example 3 of the present embodiment, in which the diopter scale of an eyepiece optical system 15 is −1.0 diopter.

In the viewfinder optical system shown in FIG. 6, a real image of an object formed on a focusing screen 13 disposed in the vicinity of an image plane I of an objective lens 11 shown in FIG. 1 is incident on an eyepiece optical system 15 through an erecting image forming member 14.

The eyepiece optical system 15 is composed of, in order from the focusing screen 13 side along an optical axis, a first lens group G1 constructed by a double concave negative lens L1, a second lens group G2 constructed by a double convex positive lens L2 and a positive meniscus lens L3 having a concave surface facing an eyepoint EP side, and a third lens group G3 constructed by a negative meniscus lens L4 having a concave surface facing the eyepoint EP side. Light passing through the eyepiece optical system 15 reaches the eyepoint EP. Diopter adjustment is carried out by moving the two positive lenses L2 and L3 of the second lens group G2 along the optical axis. In this order, the object image and a field frame formed on the focusing screen 13 can be observed with expanding manner at the eyepoint EP through the eyepiece optical system 15.

Various values associated with a viewfinder optical system M according to Example 3 are listed in Table 3.

TABLE 3

[Specifications]

| Diopter(X) = | −0.97476 | −2.01982 | +1.05397 |
|---|---|---|---|
| f = | 52.07288 | 52.52456 | 51.33368 |
| EP = | 19.50000 | 18.30000 | 21.90000 |
| ω = | 15.58028° | 15.69361° | 15.32167° |

[Lens Data]

| | r | d | ν | n | |
|---|---|---|---|---|---|
| 0) | ∞ | 0.8000 | | | (Image Plane I) |
| 1) | ∞ | 1.4000 | 57.57 | 1.491080 | (Focusing Screen 13) |
| 2) | ∞ | 3.1000 | | | |
| 3) | ∞ | 76.5873 | 64.19 | 1.516798 | (Erecting Image forming Member 14) |
| 4) | ∞ | 1.3000 | | | |
| 5) | −70.0000 | 1.2000 | 23.78 | 1.846660 | |
| 6) | 91.2033 | (D1) | | | |
| 7) | 20.3619 | 5.6000 | 64.06 | 1.516330 | (Aspherical Surface) |
| 8) | −44.0530 | 0.2000 | | | |
| 9) | 46.4097 | 3.6000 | 34.97 | 1.800999 | |
| 10) | 328.0877 | (D2) | | | |
| 11) | 30.6321 | 6.0000 | 37.16 | 1.834000 | |
| 12) | 15.4185 | (D3) | | | |

TABLE 3-continued

[Aspherical Data]
Surface Number: 7 k = 0.2621
C4 = −2.21960E−05
C6 = 1.12160E−08
C8 = −5.29280E−12

[Variable Distances]

| Diopter | −0.97476 | −2.01982 | +1.05397 |
|---|---|---|---|
| f | 52.07288 | 52.52456 | 51.33368 |
| D1 | 1.90000 | 1.20000 | 3.40000 |
| D2 | 2.70000 | 3.40000 | 1.20000 |
| D3 | 19.50000 | 18.30000 | 21.90000 |

[Values for Conditional Expressions]

(1) (G1RO + G1RE)/(G1RO − G1RE) = −0.1315
(2) (G2RO + G2RE)/(G2RO − G2RE) = −0.3678
(3) (G4RO + G4RE)/(G4RO − G4RE) = +3.0269
(4) Fd/Pd = 0.2938
(5) ndGF = 1.846660
(6) ndGE = 1.834000

Figure 7A:
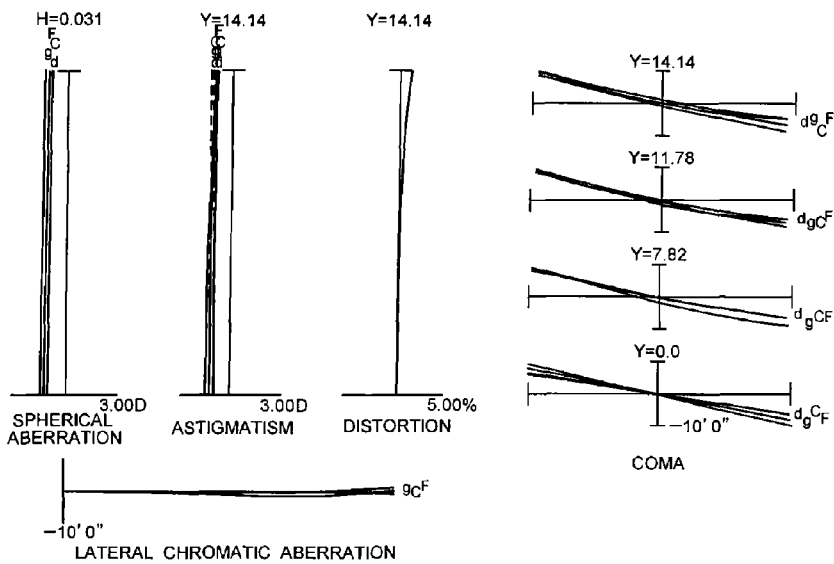
Figure 7B:
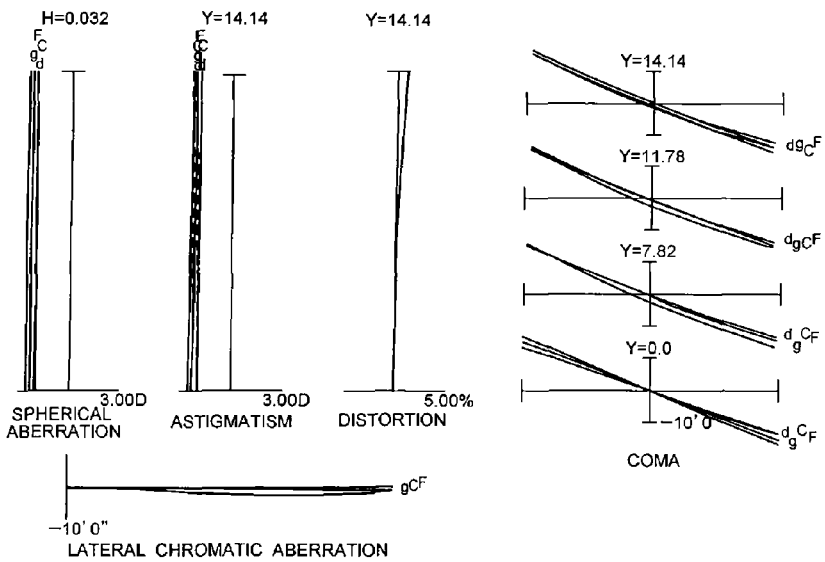
Figure 7C:
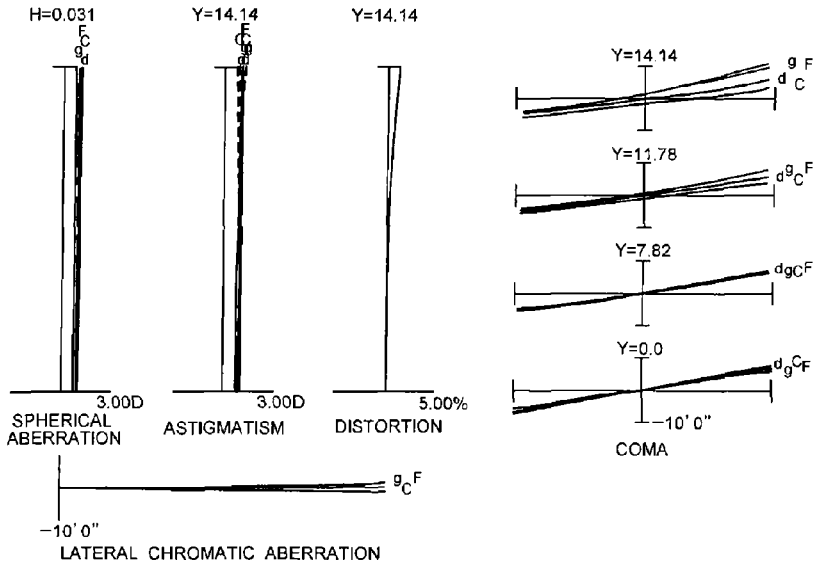

FIGS. 7A, 7B, 7C are graphs showing various aberrations of the viewfinder optical system M according to Example 3 at the eyepoint EP, in which FIG. 7A shows various aberrations in a state of −1.0 diopter, FIG. 7B shows various aberrations in a state of −2.0 diopter, and FIG. 7C shows various aberrations in a state of +1.0 diopter.

As is apparent from the respective graphs, the viewfinder optical system M according to Example 3 shows superb optical performance as a result of good corrections to various aberrations in the image field up to the periphery over entire diopter correction range from −2.0 diopter to +1.0 diopter.

As described above, the present invention makes it possible to provide a viewfinder optical system that allows a user to obtain a given observation magnification and a given distance between the eyepiece and the eyepoint, and to carry out a diopter adjustment by making optimum the distance between the focusing screen and the eyepoint upon being disposed in a camera.

Incidentally, the following description may suitably be applied within limits that do not deteriorate optical performance.

In each Example, although a three-group configuration is shown, it can be applicable to other configurations such as a two-group configuration and a four-group configuration.

The diopter adjustment may be carried out by moving a single lens group or a plurality of lens groups or a portion of a lens group along an optical axis.

Any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface to reduce flare or ghost images, so that high optical performance with a high contrast can be attained.

The above-described each example of the present embodiment only shows a specific example, so that the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A viewfinder optical system including an eyepiece optical system for observing a real image of an object formed by an objective lens through an erecting image forming member, the eyepiece optical system consisting of, in order from the object along an optical axis, a double concave negative lens, a double convex positive lens, a lens, and a meniscus lens having a convex surface facing the object; and wherein the following conditional expression is satisfied:

$$2.0 < (G4RO+G4RE)/(G4RO-G4RE) < 4.0$$

where G4RO denotes a radius of curvature of an object side surface of the meniscus lens having a convex surface facing the object, and G4RE denotes a radius of curvature of a pupil side surface of the meniscus lens having a convex surface facing the object.

2. The viewfinder optical system according to claim 1, wherein the following conditional expressions is satisfied:

$$-0.5 < (G1RO+G1RE)/(G1RO-G1RE) \leq 0$$

where G1RO denotes a radius of curvature of an object side surface of the double concave negative lens, G1RE denotes a radius of curvature of a pupil side surface of the double concave negative lens, G2RO denotes a radius of curvature of an object side surface of the double convex positive lens.

3. The viewfinder optical system according to claim 1, wherein the following conditional expression is satisfied:

$$-0.6 < (G2RO+G2RE)/(G2RO-G2RE) \leq 0$$

where G2RO denotes a radius of curvature of an object side surface of the double convex positive lens, and G2RE denotes a radius of curvature of a pupil side surface of the double convex positive lens.

4. The viewfinder optical system according to claim 1, wherein the following conditional expression is satisfied:

$$0.20 < Fd/Pd < 0.50$$

where Pd denotes an optical path length of the erecting image forming member, and Fd denotes a distance between the pupil side surface of the erecting image forming member and the last lens surface of the eyepiece optical system.

5. The viewfinder optical system according to claim 1, wherein the following conditional expression is satisfied:

$$1.80 < ndGF$$

where ndGF denotes refractive index of the lens disposed to the most object side of the eyepiece optical system.

6. The viewfinder optical system according to claim 1, wherein the following conditional expression is satisfied:

$$1.70 < ndGE$$

where ndGE denotes refractive index of the lens disposed to the most pupil side of the eyepiece optical system.

7. The viewfinder optical system according to claim 1, wherein the following conditional expressions are satisfied:

$$0.20 < Fd/Pd < 0.50$$

$$1.80 < ndGF$$

$$1.70 < ndGE$$

where Pd denotes an optical path length of the erecting image forming member, Fd denotes a distance between the pupil side surface of the erecting image forming member and the last lens surface of the eyepiece optical system, ndGF denotes refractive index of the lens disposed to the most object side of the eyepiece optical system, and ndGE denotes refractive index of the lens disposed to the most pupil side of the eyepiece optical system.

8. The viewfinder optical system according to claim 1, wherein the eyepiece optical system consists of, in order from the objective lens side along the optical axis, a first lens group G1 having negative refractive power, a second lens group G2 having positive refractive power, and a third lens group G3 having negative refractive power, the second lens group G2 is constructed by two lenses, and
a diopter adjustment is carried out by moving the second lens group along the optical axis.

9. The viewfinder optical system according to claim 1, wherein the eyepiece optical system consists of, in order from the objective lens side along the optical axis, a first lens group G1 having negative refractive power, a second lens group G2 having positive refractive power, and a third lens group G3 having negative refractive power, and any one of three lens groups has an aspherical surface.

10. An optical apparatus having the viewfinder optical system according to claim 1.

11. A method for expanding observation comprising steps of:

providing an objective lens for forming a real image;
providing an eyepiece optical system that consists of, in order from an object along an optical axis, a double concave negative lens, a double convex positive lens, a lens, and a meniscus lens having a convex surface facing the object,
satisfying the following conditional expression:

$$2.0 < (G4RO+G4RE)/(G4RO-G4RE) < 4.0$$

where G4RO denotes a radius of curvature of an object side surface of the meniscus lens having a convex surface facing the object, and G4RE denotes a radius of curvature of a pupil side surface of the meniscus lens having a convex surface facing the object; and
carrying out expanding observation of the real image through an erecting image forming member and the eyepiece optical system.

12. The method according to claim 11, further comprising a step of:
satisfying the following conditional expressions:

$$-0.5 < (G1RO+G1RE)/(G1RO-G1RE) \leq 0$$

where G2RO denotes a radius of curvature of an object side surface of the double convex positive lens, and G2RE denotes a radius of curvature of a pupil side surface of the double convex positive lens.

13. The method according to claim 11, further comprising a step of:
satisfying the following conditional expression:

$$-0.6 < (G2RO+G2RE)/(G2RO-G2RE) \leq 0$$

where G2RO denotes a radius of curvature of an object side surface of the double convex positive lens, and G2RE denotes a radius of curvature of a pupil side surface of the double convex positive lens.

* * * * *